United States Patent [19]

Sturman et al.

[11] Patent Number: 4,516,600
[45] Date of Patent: May 14, 1985

[54] PRESSURE REGULATING VALVES

[76] Inventors: Oded E. Sturman, 18241 Andrea Cir. N.; Benjamin Grill, 9819 Etiwanda Ave., both of Northridge, Calif. 91329; Lynn Harrison, 23554 Cherry St., Newhall, Calif. 91321

[21] Appl. No.: 585,379

[22] Filed: Mar. 2, 1984

Related U.S. Application Data

[63] Continuation-in-part of Ser. No. 378,139, May 14, 1982, abandoned.

[51] Int. Cl.³ .............................................. F16K 31/14
[52] U.S. Cl. ................................... 137/495; 137/220; 137/505.18; 137/505.25; 251/367
[58] Field of Search ........... 137/219, 220, 505, 505.14, 137/505.15, 505.18, 505.25, 495; 251/367

[56] References Cited

U.S. PATENT DOCUMENTS

| | | | |
|---|---|---|---|
| 1,483,240 | 2/1924 | Olson | 137/495 |
| 2,091,051 | 8/1937 | Mesinger | 137/505.18 |
| 2,590,622 | 3/1952 | Huber | 137/505.18 X |
| 2,730,269 | 1/1956 | Earle | 137/505.18 X |
| 2,888,033 | 5/1959 | Eickmeyer | 137/505 |
| 3,087,705 | 4/1963 | Hamilton | 137/505.18 X |
| 3,115,068 | 12/1963 | Lofiuk | 137/505.18 X |
| 3,358,964 | 12/1967 | Cohen | 137/505.18 X |
| 3,777,777 | 12/1973 | Katchka | 137/505.18 X |
| 4,173,233 | 11/1979 | Snyder | 137/495 X |
| 4,314,582 | 2/1982 | Drori | 137/495 |

FOREIGN PATENT DOCUMENTS

| | | | |
|---|---|---|---|
| 962161 | 2/1975 | Canada | 137/505.18 |
| 2305687 | 8/1973 | Fed. Rep. of Germany | 137/505.18 |
| 668347 | 3/1952 | United Kingdom | 137/495 |
| 121292 | 9/1961 | U.S.S.R. | 137/505.18 |

Primary Examiner—Harold W. Weakley

[57] ABSTRACT

Pressure regulating valves intended primarily for use as pressure regulating shut-off valves are disclosed. The valves utilize a simple piston assembly operative between a valve open position and a valve closed position responsive to a spring biasing the assembly toward the open position against an opposite force proportional to the outlet pressure. The piston assembly has only a single seal to seal the assembly against leakage, with a shut-off mechanism operative on only a 180 degree rotation thereof being cooperatively disposed with respect to the piston assembly so as to not require any additional seals. Embodiments having a fixed pressure regulation and a manually adjustable pressure regulation are disclosed.

9 Claims, 23 Drawing Figures

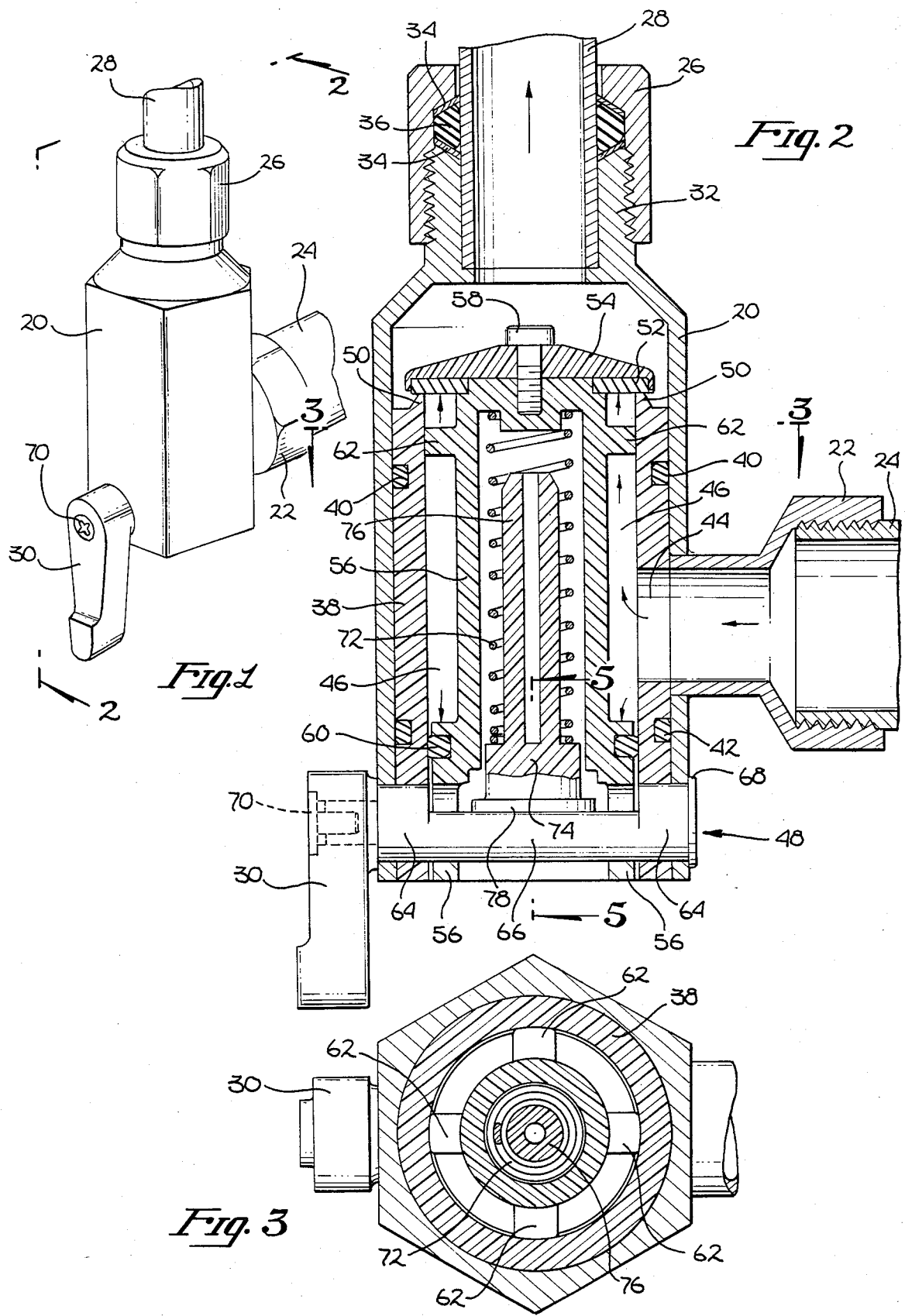

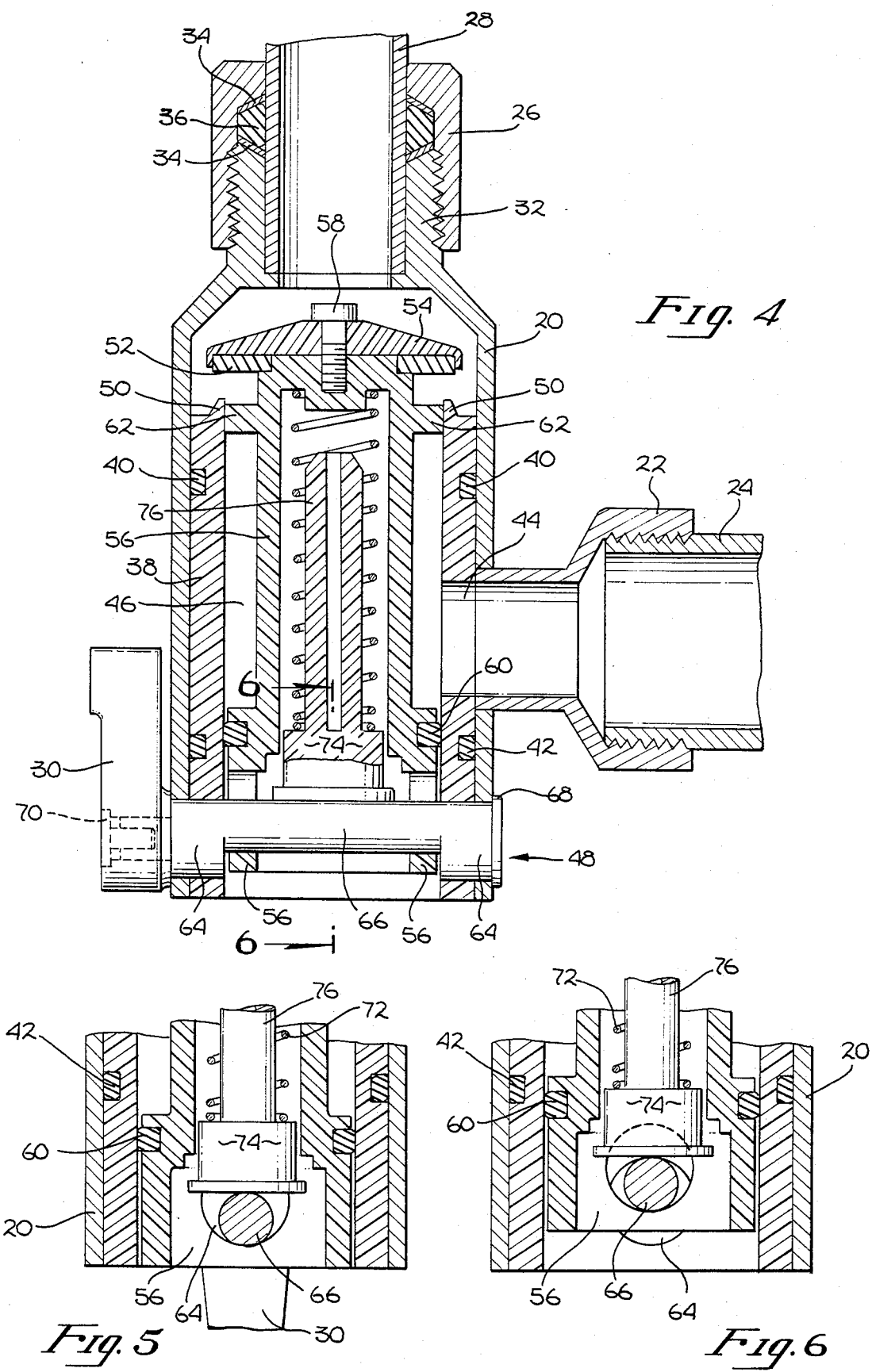

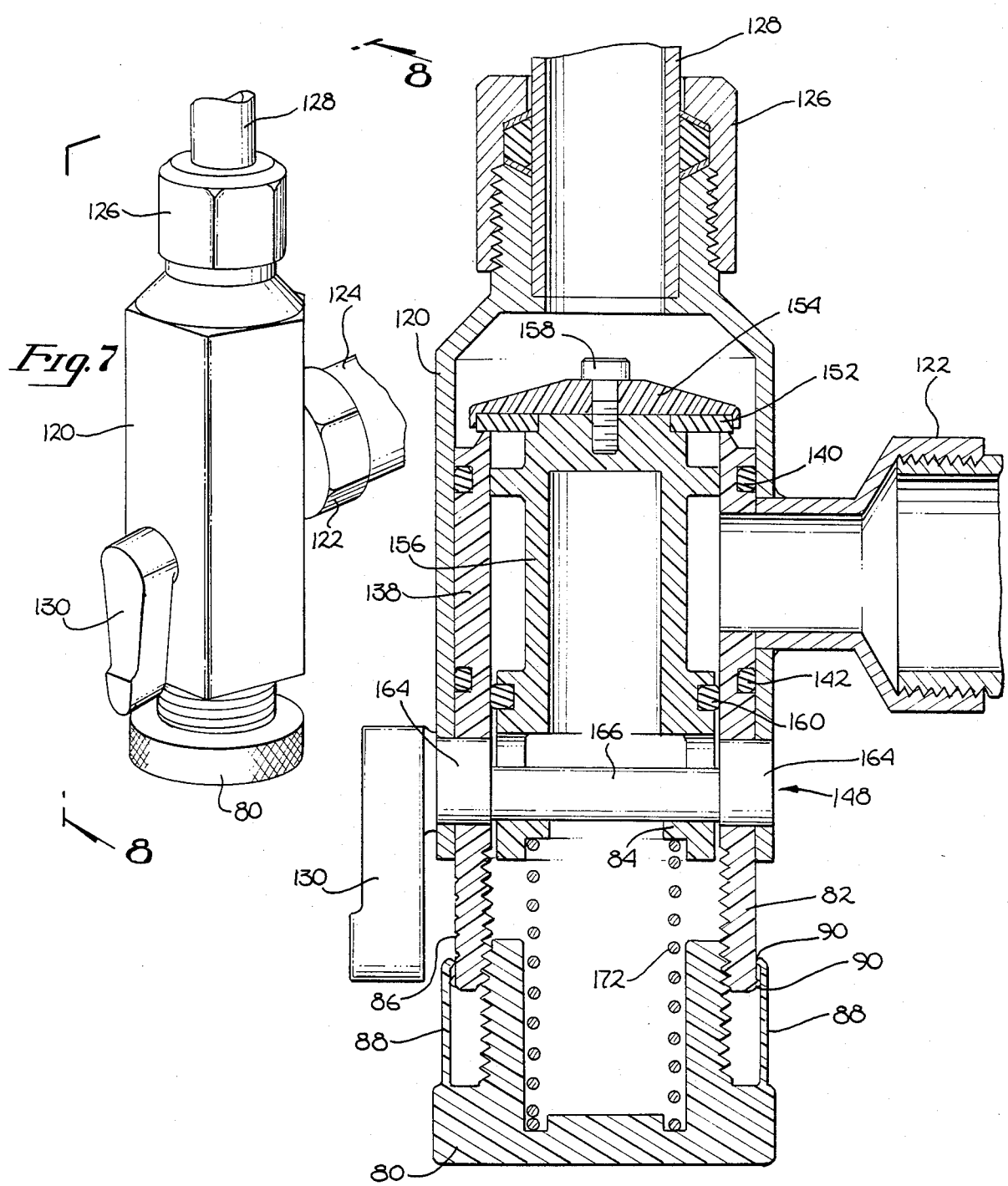

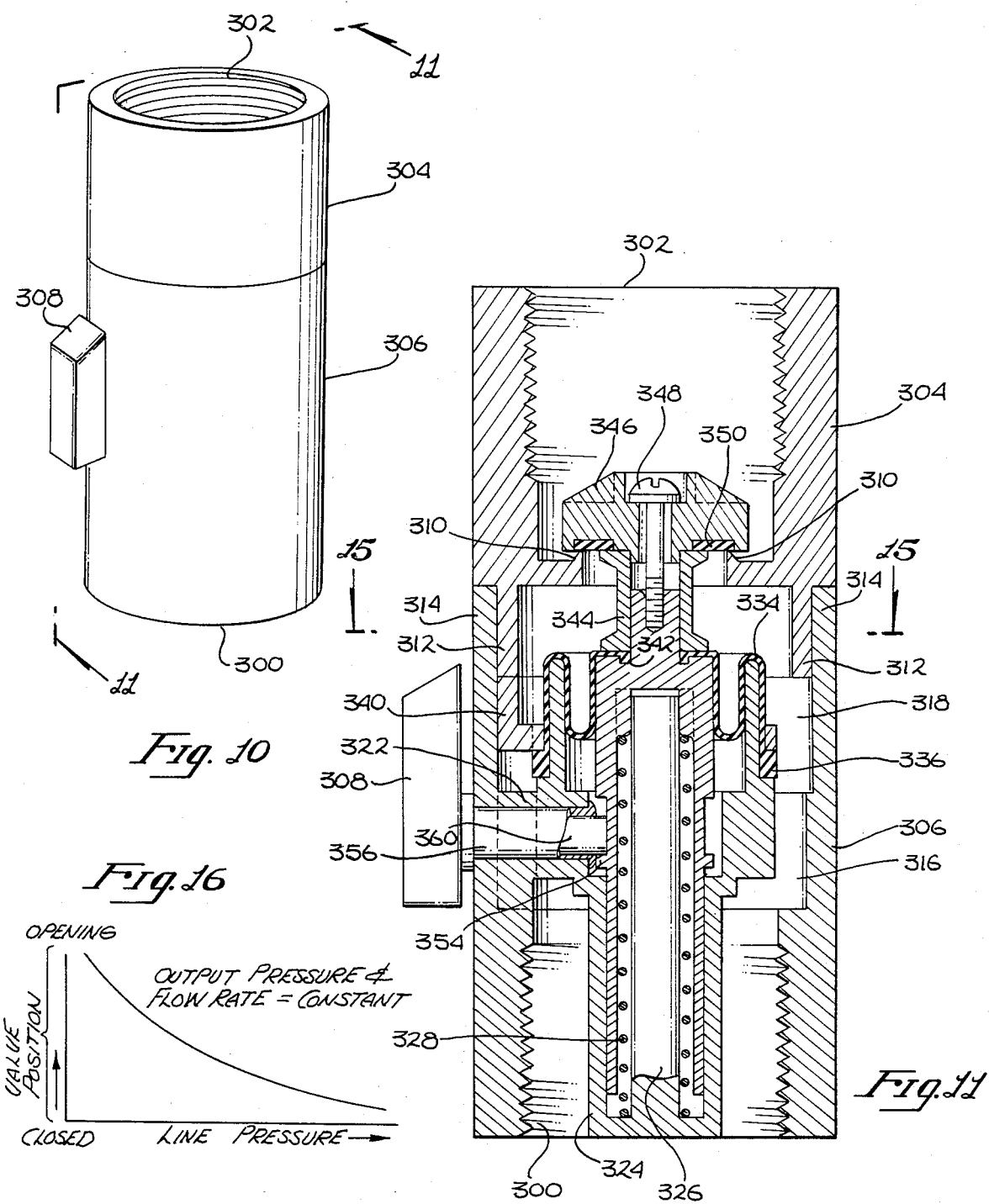
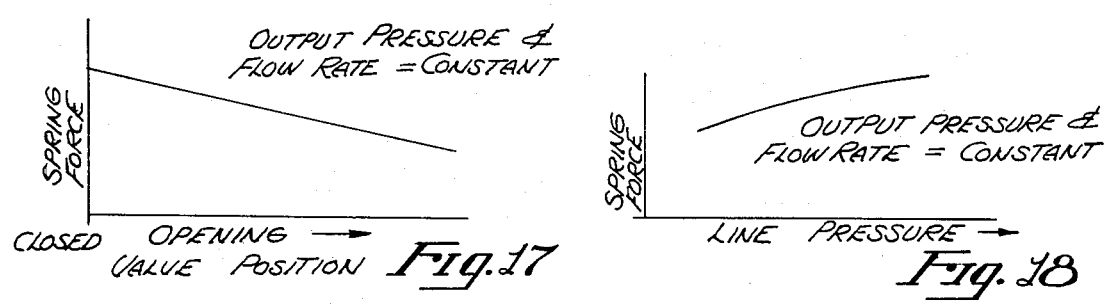

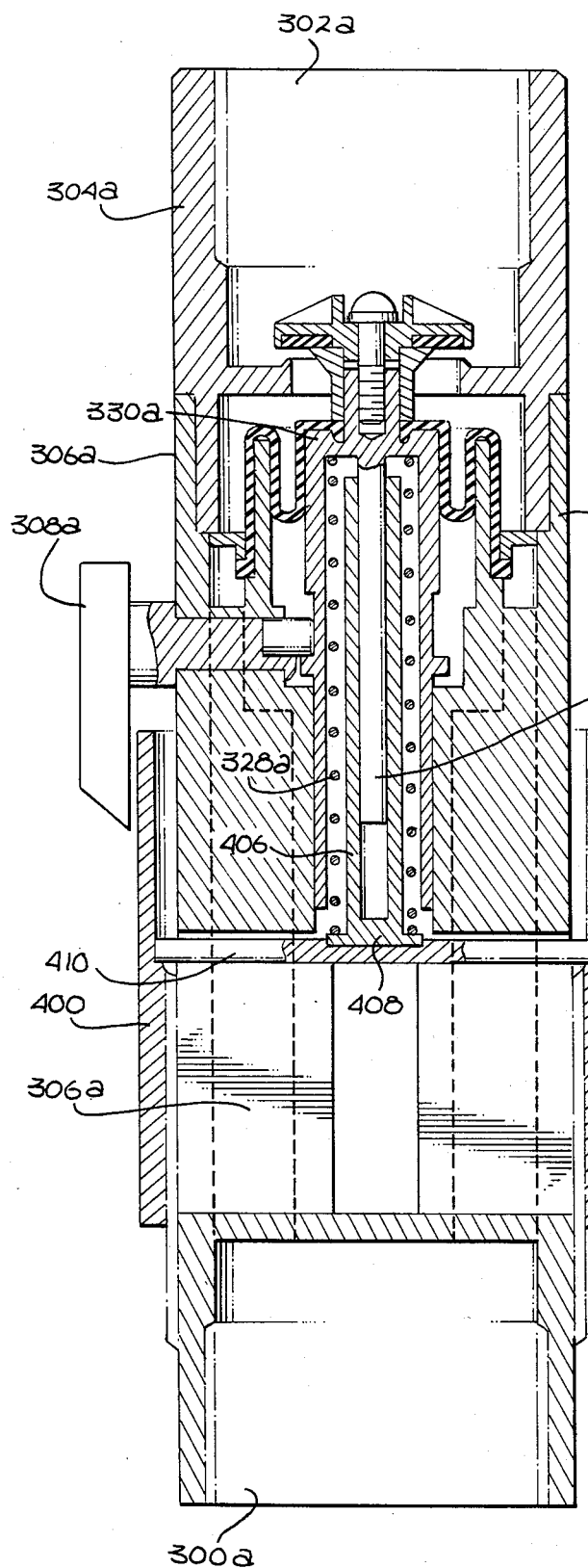
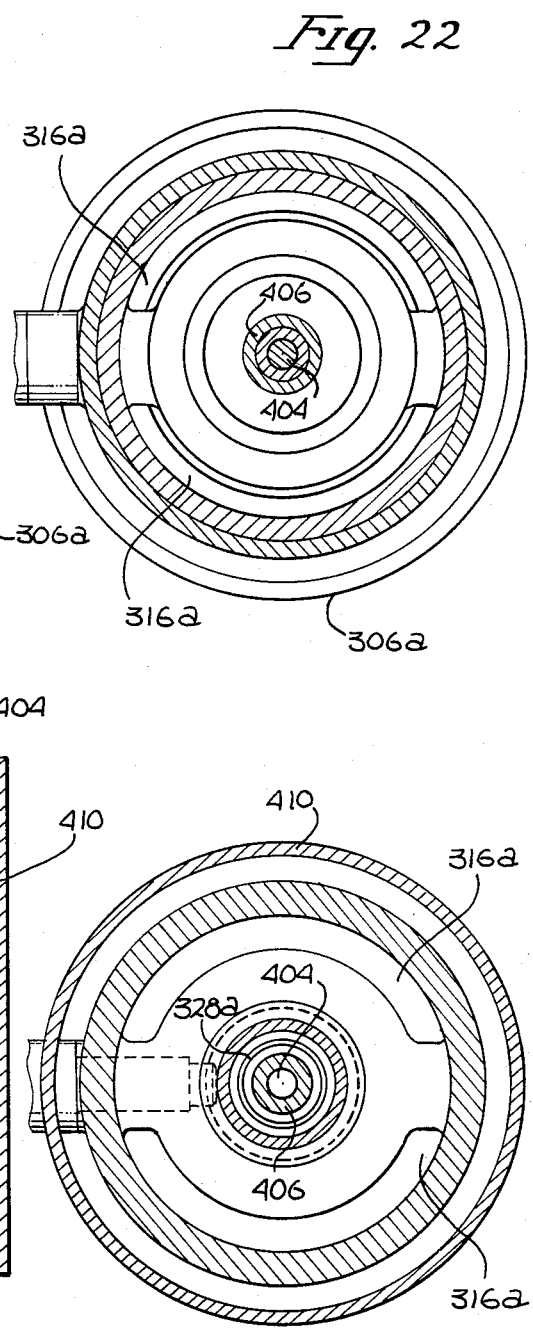
Fig. 21
Fig. 22
Fig. 23

PRESSURE REGULATING VALVES

This is a continuation-in-part of application Ser. No. 378,139 filed May 14, 1982, now abandoned.

BACKGROUND OF THE INVENTION

The present invention relates to the field of pressure regulators and valves, and more particularly, to valves generally used in inline applications to provide a simple on/off control.

PRIOR ART

In many applications around the home and elsewhere, valves are used in various inline applications to provide an on/off control for the supply of water, natural gas and other fluids to appliances and other devices which, in turn, normally have their own valve control system. Since the preferred embodiment of the present invention is intended for use in the home, and such use is exemplary of typical prior art valves and the advantages of the present invention, such use will be used as examplary of the prior art. It is to be understood however, that the present invention is not so limited.

Shut off valves are commonly used in the home in water lines such as those connected to sink faucets, toilets and appliances, such as dishwashers and refrigerator ice cube makers. Such valves have now become relatively standard, with large quantities of the standard valve being manufactured and sold every year. In other instances such as for clothes washers, conventional hose bib faucets are used for the same purpose. In either case, in use the valves normally remain open, being closed only when the appliance itself is leaking, is being repaired or is being disconnected for some reason. Consequently, normally the only function of such prior art valves is to merely provide a turnoff capability prior to connection of the appliance, and thereafter only when required for some reason.

Prior art valves for such purposes are of relatively standard construction, having a valve seat between the inlet and outlet thereof. A valve closure member is disposed in cooperative position with respect to the seat and supported on a shaft passing through the valve body having an external handle thereon. A portion of the shaft has a lead screw thereon so that by rotating the handle, the valve closure member may be forced against the seat to close the valve, or moved away therefrom for opening the valve. Sealing of the valve around the shaft supporting the valve closure member is frequently provided by some form of packing operating against a smooth portion of the shaft. While theoretically such valves could be used for flow rate control, they normally are not so used when coupled to appliances and the like, as one has no measure of what the proper flow rate would be, and any adjustment, even if proper, would only apply to the then existing line pressure. Accordingly, such shut off valves are normally left in the fully opened position when connected to an operable appliance, toilet or the like.

The valves within most appliances and toilets normally operate between a fully valve closed position and a fully valve open position so that abrupt changes in flow rates occur. This frequently may have a substantial affect on the overall system line pressure, with the result that the opening of one valve in the system will reduce the system pressure and thus the flowthrough another already open valve, sometimes with undesired results. By way of example, in homes having two or more bathrooms it is common for two bathrooms to be positioned back-to-back so that common hot and cold water supply lines may be used. In such instances, the flushing of a toilet in one bathroom will reduce the cold water line pressure, thereby reducing the flow of cold water through a previously comfortably adjusted shower in the other bathroom, temporarily changing the shower water temperature from comfortable to unpleasantly hot. The extent of the problem, of course, depends upon various system parameters such as the size of supply lines, etc., though it is uncommon for the operation of any device requiring substantial flow rates to not significantly affect the flow rates in other operating devices.

In addition to the foregoing, it should be noted that certain appliances and other water utilizing devices are designed to operate satisfactorily at some specified minimum pressure. Generally speaking, this means that flow rates, etc. must be adequate at the minimum pressure for proper operation of the appliance. At higher pressures however, the flow rates will generally increase beyond that for proper operation of the appliance, frequently at the expense of the use of at least some water in addition to the minimum required. In that regard, while the usual line pressure in some homes may only be somewhat higher than the minimum pressure for which the appliance was designed, the usual line pressure in other homes may be two or three times higher than the design pressure. Aside from the needlessly high flow rates, such high pressure puts unnecessary strain on hoses and other pressure devices within the appliance. For all of the foregoing reasons, it would be desirable to incorporate a pressure regulator at each appliance, faucet, etc. so that the device will not see the line pressure variation, and will not see any pressure substantially above the design pressure level.

An example of a pressure balanced regulator is U.S. Pat. No. 3,756,558 by Okui. Okui discloses in the first figure thereof, a fluid control valve having an inlet and an outlet with a moving member between the inlet and outlet chambers. In the Okui valve, both the input and output portions of the device are pressure balanced, thereby requiring additional structure to sense the outlet pressure and control the moving member for regulation of flow. This additional structure adds cost to the device and increases the likehood of breakdown. Further, the only shut-off capability this device has is by way of a multi-turn adjustment of the regulated pressure control to effectively reduce the regulated pressure to zero.

An additional example of previous pressure regulating valves is U.S. Pat. No. 702,266 by Webb. As with Okui, Webb discloses a valve which is pressure balanced on the input side. The valve is a relatively complicated, and not suitable for use as a compact pressure regulating shut-off valve as is the present invention. Further, the shut-off capability is provided by a lead screw mounted member projecting into the low pressure area of the regulator, thereby requiring multiple turns for the on/off control and providing an additional source of leakage in the valve.

BRIEF SUMMARY OF THE INVENTION

Pressure regulating valves intended primarily for use as pressure regulating shut-off valves are disclosed. The valves utilize a simple piston assembly operative between a valve open position and a valve closed position responsive to a spring biasing the assembly toward the open position against an opposite force proportional to the outlet pressure. The piston assembly has only a single seal to seal the assembly against leakage, with a shut-off mechanism operative on only a 180 degree rotation thereof being cooperatively disposed with respect to the piston assembly so as to not require any additional seals. Embodiments having a fixed pressure regulation and a manually adjustable pressure regulation are disclosed.

BRIEF DESCRIPTION OF THE DRAWINGS

FIG. 1 is a perspective view of one embodiment of the present invention pressure regulating valve.

FIG. 2 is a cross section taken on an expanded scale along line 2—2 of FIG. 1.

FIG. 3 is a partial cross section taken along line 3—3 of FIG. 2.

FIG. 4 is a cross section similar to FIG. 2, though illustrating the pressure regulating valve mechanism in the open position.

FIG. 5 is a partial cross section taken along line 5—5 of FIG. 2 illustrating certain aspects of the valve shut-off mechanism when in the valve closed position.

FIG. 6 is a partial cross section taken along line 6—6 of FIG. 4 illustrating certain aspects of the valve shut-off mechanism when in the valve open position.

FIG. 7 is a perspective view of another embodiment of the present invention having a manually variable regulating pressure.

FIG. 8 is a cross section taken along line 8—8 of FIG. 7 illustrating the mechanism thereof.

FIG. 10 is a perspective view of a further embodiment of the present invention.

FIG. 11 is a cross section taken on an expanded scale along line 11—11 of FIG. 10 showing the valve in the closed position.

FIGS. 16 through 18 are curves illustrating valve position versus line pressure, spring force versus valve position and spring force versus line pressure, respectively, all for constant output pressure and flow rate for a typical valve of the present invention.

FIGS. 19 through 23 are views illustrating a still further embodiment having an adjustable regulating pressure.

DETAILED DESCRIPTION OF THE INVENTION

Figure 9:
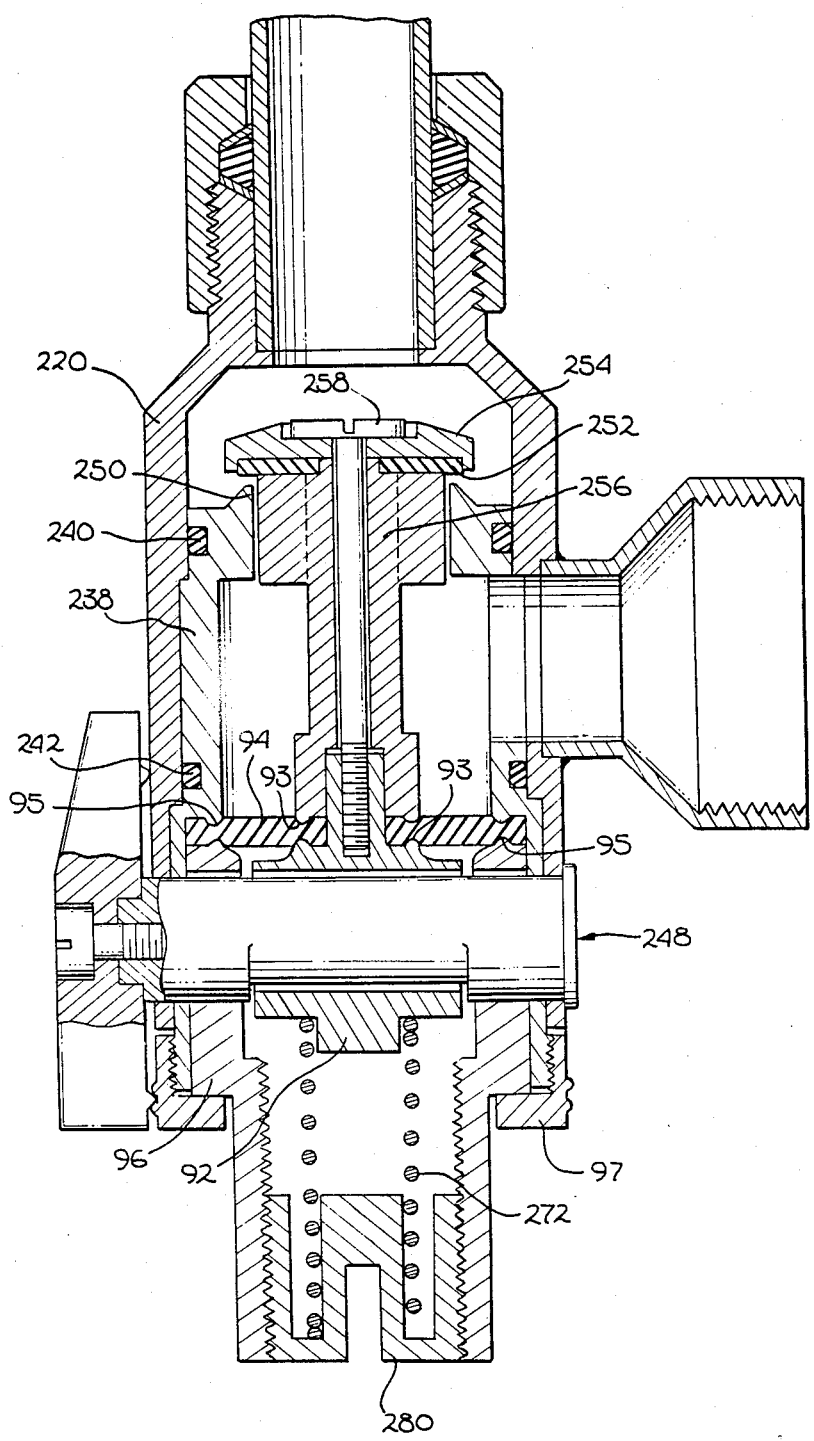
FIG. 9 is a cross section of an alternate embodiment utilizing a diaphragm as a sealing member.

First referring to FIG. 1, a perspective view of one embodiment of the present invention as it would be coupled to a waterline such as a faucet water supply line may be seen. This embodiment is characterized by an outer valve body 20, a standard female pipe connection 22 for connection to a standard threaded pipe supply line 24, and an upward projecting nipple which together with nut 26 provides a standard coupling to tubing 28, coupled to a faucet in the exemplary application. The valve is also characterized by lever 30 which provides a simple on off control for the pressure regulating valve of this embodiment. As shall subsequently be seen, with the lever in the position shown in FIG. 1, the pressure regulating valve member is held or constrained to a valve closed position, whereas rotation of lever 30 by 180 degrees releases the pressure regulating valve member so that it may seek a position establishing and maintaining the outlet pressure at the predetermined regulated value.

Now referring to FIG. 2, a cross section of the valve of FIG. 1 taken along line 2—2 of that figure may be seen. Valve body 20 in the preferred embodiment is a brass member having a generally cylindrical inner wall, terminating at the upper end at the threaded nipple 32. The nipple 32 in combination with nut 26, conical washers 34 and rubber member 36 provide the conventional compression coupling to tubing 28, characteristically used with shut off valves for faucets and the like. The female pipe connection 22 for the valve inlet is also a brass member, in the preferred embodiments being brazed to body 20 to provide a permanent integral assembly of the two brass parts.

Fitting within the inner diameter of body 20 is a generally tubular member 38, being sealed ith respect to the body 20 both above and below the inlet connection 22 by O-rings 40 and 42, respectively. The tubular member has an opening or hole 44 cooperatively disposed with respect to the inlet connection 22 to provide fluid communication between the inlet port and region 46. The tubular member 38 is retained in the assembly both linearly and angularly by the shaft, generally indicated by the numeral 48, the full configuration and function of which shall be subsequently described herein.

The upper end of tubular member 38 terminates in a valve seat 50 having a diameter substantially equal to the inner diameter of the tubular member. Cooperating with the valve seat is a closure member 52 retained by cap 54 supported on piston 56 by screw 58. The piston 56, aside from supporting the elastic valve closure member 52, extends downward to support an O-ring 60 sealably sliding within the inner diameter of tubular member 38 below the opening 44 therein. The O-ring 60 of course seals the piston with respect to the tubular member to prevent fluid leakage thereby. The piston 56 is centered with respect to the inner diameter of tubular member 38 adjacent the top thereof by four symmetrically disposed projections 62 shown also in FIG. 3, a cross section taken along line 3—3 of FIG. 2. The projections 62 are proportioned to have a loose sliding fit within tubular member 38 for centering purposes, while at the same time providing a substantial flow area between the protrusions.

In this embodiment, as shown in FIG. 2, the lower end of the brass housing 20, the tubular member 38 and the piston 56 all have a hole therethrough of a diameter substantially equal to the diameter of regions 64 of pin 48. Pin 48 also has a central crank or cam region 66, which region is a region of smaller diameter than region 64 and is substantially tangent thereto at the bottom of the pin 48 (using the orientation of FIG. 2). This may also be seen in FIG. 5, which is a partial cross section taken along line 5—5 of FIG. 2. With the angular orientation of pin 48 as shown in FIG. 2, crank region 66 of the pin is forced against the bottom of the hole in the piston 56, thereby holding the piston down or in the valve closed position shown in FIG. 2. Pin 48 itself is retained in the holes in the bottom of housing 20 and tubular member 38 by flange 68 at one end thereof and lever 30 coupled to the other end thereof in a conventional manner for valve handles, i.e., through a square or hex drive interfitting of the handle onto an extension of shaft 48, the handle being retained thereon by screw 70.

In addition to the foregoing described elements, a coil spring 72 is provided to yieldably encourage the piston 56 upward toward a valve open position. The coil spring is disposed within piston 56 and operates between the piston and a spring retainer 74, which receives the lower end of the spring and which has a central upward projecting protrusion 76 to keep the spring from buckling significantly under the compressive load thereon. The spring retainer 74 has a flange 78 on the lower end thereof which rests on crank region 66 of pin 48.

It may be seen from the assembly of FIG. 2 that tubular member 38 is retained in angular and longitudinal position in the housing 20 by portions 64 of pin 48. In addition, while coil spring 72 is urging the piston upward to a valve open position, the engagement of crank region 66 of pin 48 with the lower portion of the hole through the piston 56, as shown in FIG. 5, retains the piston in the valve closed position shown. Further, while the force between portion 66 and piston 56 provides some drag or resistance to rotation of pin 48 from the position shown in FIG. 2, additional resistance to rotation is provided by the engagement of flange 78 of spring retainer 74 with the same portion of the pin, i.e., portion 66.

With the valve in the closed position as shown in FIG. 2, pressure in the inlet line 24 provides an upward force on the valve closure member 52 and a downward force upon the region of the piston 56 containing O-ring 60. Because the areas of these two pressure forces are equal, the two forces themselves are equal, so that the inlet pressure exerts no net force on the piston. There is, of course, some downward force on the piston assembly caused by the outlet pressure operating on an effective area equal to the cross sectional area of the inside of tubular member 38, an upward force due to coil spring 72, and of course, whatever downward force is required by region 66 of pin 48 to retain the piston in the valve closed position.

When lever 30 is rotated 180 degrees to the open position as shown in FIG. 4, crank region 66 of pin 48 rotates to its upper position shown also in the partial cross section of FIG. 6 taken along line 6—6 of FIG. 4. When in this position piston 56 is free to move upward as shown in FIG. 4 to a valve open position, the allowed upward motion being equal to the difference in diameters between crank region 66 and regions 64 of pin 48. As the outlet pressure reaches the regulated pressure however, the downward force on the piston due to the outlet pressure will equal the spring force, so that the valve will move toward the valve closed position as may be required to maintain the outlet pressure at the regulated value, determined by (i), the balance in the outlet pressure force times the internal cross sectional area of the tubular member 38, and (ii), the spring force. Obviously, of course, when the faucet or other device coupled to tube 28 is closed, the piston will move back down to the position shown in FIG. 2 to close the valve of the present invention to reduce the flow to zero and maintain the regulated output pressure for the zero flow condition.

The valve of FIG. 1 through 6 may be assembled as follows. Coupling 22 is brazed to housing 20, either in a manner so as to not disturb the inner diameter of the housing, or alternatively prior to finishing the internal diameter of housing 20. Then the assembly of tubular member 38, piston 56, cap 54, valve closure member 52 and screw 58, together with the three O-rings is completed. That assembly is then slid into the housing 20, with an appropriate alignment tool extended through coupling 22 aligning hole 44 with tubular member 38 to establish the angular and vertical position of the tubular member with respect to the housing. This will also align the hole in the lower end of the tubular member with the cooperatively disposed hole in the lower end of housing 20. Thereafter coil spring 72 and spring retainer 74 are placed in position, and with an appropriate tool extending through the outlet port to hold the piston assembly in the valve closed position and at the same time to push against flange 78 of spring retainer 74 to compress the spring as much as possible pin 48 is inserted through the aligned holes in tubular member 38 and housing 20. For that purpose, flange 78 is specifically made bigger in diameter than regions 64 on pin 48 so that the spring retainer 74 may be held in the assembly position by a tool which will reach around pin 48, thereby not interfering with the insertion thereof. Thereafter, of course, handle 30 is coupled to the pin 48 to complete the assembly.

With the valve in the valve open or regulating position shown in FIG. 4, piston 56 will generally be free to move up and down as required to provide the regulated flow of fluid without contact with crank 66 of pin 48 and accordingly, the piston will not cause any frictional resistance to rotation of pin 48 toward the valve closed position. However, the downward force of spring 72 on the spring retainer 74 provides a substantial and continuous resistance to rotation of pin 48 to provide a frictional drag resisting rotation of the pin. If desired, of course, the portion of region 66 engaging flange 78 on the spring retainer may be appropriately flattened on the top and bottom thereof to provide a detent for pin 48 at the open and closed positions. Such a flat or other detent, of course, will not affect the operation of the pin or cooperation thereof with the piston 56, as it is a different portion of region 66 which operates as a cam against the hole in the lower portion of piston 56 to clamp the pressure regulating valve of the present invention in the valve closed position. Obviously, other forms of detents may also readily be used such as, by way of example, a slight protrusion on the lower end of spring retainer 74 which may engage cooperatively disposed depressions on opposite sides of region 66 of the pin.

Now referring to FIGS. 7 and 8, another embodiment of the present invention may be seen. This embodiment in many respects is very similar to the embodiment hereinbefore described with respect to FIGS. 1 through 6, and many of the parts of the embodiment of FIGS. 7 and 8 have a one to one correspondence with corresponding or equivalent parts in the earlier described embodiment. Accordingly, in those instances where parts are either identical or are similar in form and function, though not identical to the parts of the earlier embodiment, such parts are given the same identification number as in the earlier embodiment, but preceeded with a "1" to distinguish therefrom. By way of example, parts such as O-rings 140, 142 and 160, as well as sealing member 152, cap 154 and screw 158 may be identical to those of the earlier embodiment pressure regulating valve of the same size. On the other hand, the piston 156 is functionally very similar to piston 56, though is somewhat reconfigured for reasons about to be described.

As may be seen in FIG. 7, the pressure regulating valve of this embodiment is generally very similar to the previously described embodiment. Female coupling 122 projecting from the side of body 120 provides a standard pipe coupling to a supply pipe 124, with the pressure regulated outlet being coupled to outlet tube 128 through jam nut 126, etc. Similarly, control lever 130 provides the on/off control as before, though the lever itself is integral with shaft 148, as may be seen in FIG. 8.

One important difference in the embodiment of FIGS. 7 and 8 is the adjustability of the regulated pressure which will be provided by the valve. This adjustability is provided by adjustment screw 80 which threads into a downward extending projection 82 on the lower portion of tubular member 138. Located within adjustment screw 80 is coil spring 172 extending between the adjustment screw and bottom region 84 of the piston 156. By control of the adjustment screw, the compression on coil spring 172 may be varied, thereby varying the outlet pressure required to balance the spring pressure, i.e., therefore varying the regulated pressure which will be delivered by the valve. If desired, a small scale 86 may be molded into the side of the region 82 of cylindrical member 138 which, together with an upward extension 88 on adjustment screw 80, will provide a visible reading of the pressure adjustment. Also, if desired, small interfering protrusions 90 may be located adjacent the top inner wall of extension 88 and on the lower outer surface of the extension 82 of the cylindrical member 138 so as to provide substantial resistance to further unscrewin9 of the adjustment screw ust before the end of the threaded region is reached, thereby providing a tactile feedback before the adjustment screw is inadvertently completely unscrewed from the valve assembly.

In the previously described embodiment, the shaft 48 and handle 30 are fabricated as separate parts and held together by screw 70. In the embodiment of FIGS. 7 and 8, the shaft and handle are of one piece construction. The cam or crank region 166 of the shaft is, of course, eccentric to the cylindrical regions 164 as before, though not quite so much as to be quite tangent to the periphery of regions 164. Accordingly, as may be seen in FIG. 8 which illustrates the valve in the valve closed position, there is a slight step at the junction of crank 166 and cylindrical regions 164 so that the shaft 148 cannot be withdrawn once the valve is assembled. In particular, because of that step, the lower region 84 of piston 156 will always interfere with cylindrical region 164 opposite the lever 130 to prevent withdrawal of the shaft. In that regard, assembly of the embodiment of FIGS. 7 and 8 would proceed in much the same manner as in the earlier embodiment, with the exception that screw 158 would initially be left loose so that the piston 156 could be pushed down further than the normal valve closed position shown in FIG. 8 to allow the insertion of shaft 164, the screw 158 being tightened after the shaft is inserted.

It may be seen from the foregoing description, taken in conjunction with the description of the prior art, that the present invention pressure regulating valves have a number of advantages when used in place of conventional inline shutoff valves for faucets, appliances and the like. The present invention valves of course are easily turned on and off by a simple 180 degree turn of the control lever, as opposed to requiring multiple turns of a control handle characteristic of the prior art. Further, the turnoff mechanism of the preferred embodiments of the present invention is separate and apart from any region in fluid communication with either the inlet or the outlet regions of the pressure regulating valve, and thus does not present any separate or independent source of possible leakage. The entire pressure regulating valve is operative with a single moving seal, rather than multiple seals, to obtain both the pressure regulation and shut off capabilities. Obviously, while an O-ring seal is disclosed, other forms of seal such as a chevron seal or diaphragm could be used if desired. Such an embodiment is shown in FIG. 9.

In the embodiment of FIG. 9, a housing 220 similar to the housings of the previously described embodiments, though having two steps on the internal diameter thereof, is provided. Within the housing is the cylindrical member 238, sealed with respect thereto by way of O-rings 240 and 242. The cylindrical member, of course, is provided with a valve seat 250 at the top thereof with a piston 256 having a cap 254 and sealing member 252 held on by screw 258 providing the valve closure assembly for throttling or shutting off the flow as may be required to maintain the regulated output pressure.

The screw 258 of this embodiment passes through most of the piston 256 and threads into the top of member 92, the lower end of the piston 256 and the top of member 92 having protrusions 93 for engaging and retaining the inner portion of a diaphragm 94. The outer periphery of the diaphragm 94 is retained in a similar manner between protrusions 95 on the cylindrical member 238 and similar protrusions 95 on the top of member 96, held in place by a retaining cap 97 screwed onto the lower end of cylindrical member 238 which projects past the bottom of housing 220. In that regard, the hole through member 96 for pin 248 is purposely made somewhat oversize so that retaining ring 97 may force member 96 upward to tightly entrap the outer periphery of the diaphragm 94 without bottoming on the pin. The diaphragm itself as proportioned in relation to the valve seat so as to respond to an inlet pressure $P_{in} A_s$, where $A_s$ is the area of the valve seat, whereby the inlet pressure is balanced and causes no net force on the piston assembly.

The embodiment shown in FIG. 9 is also an adjustable embodiment similar to that of FIG. 8, in that screw 280 threadedly engaging member 96 allows adjustment of the compression of spring 272 which determines the pressure of regulation of the valve. Thus a fully adjustable pressure regulating shut-off valve is provided with the embodiment of FIG. 9 without any sliding O-ring or chevron seals and with only a single diaphragm seal as shown. Preferably the region around the diaphragm is provided with gently curved surfaces substantially free of any sharp edges so that even upon a gross over pressure condition, the diaphragm 94 will be cradled to prevent a rupture thereof.

Now referring to FIG. 10, a still further embodiment may be seen. This embodiment is characterized by coaxial inlet and outlet ports 300 and 302 respectively, both of which have internal pipe threads for threading onto inlet and outlet pipes. The body of the embodiment of FIG. 10 is comprised of upper and lower body members 304 and 306, with a control handle 308 being provided through the lower body member 306 for on/off flow control.

Figure 12:
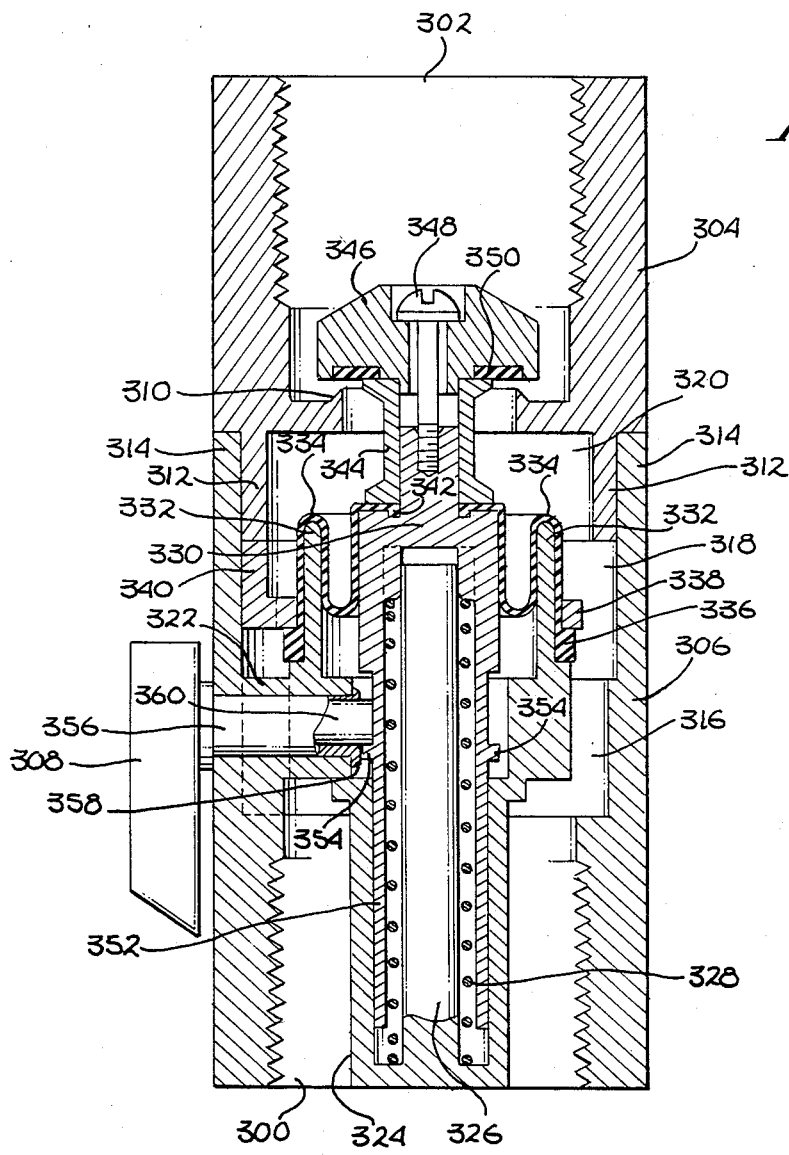
FIG. 12 is a cross section corresponding to FIG. 11 but illustrating the valve in an open and pressure regulating position.
Figure 15:
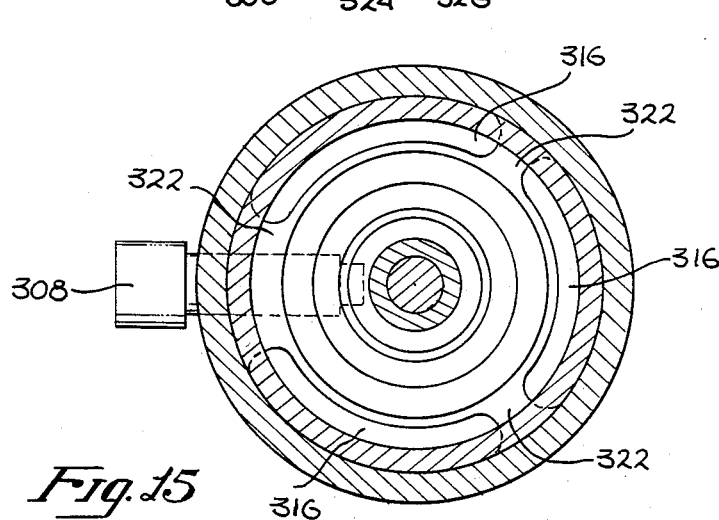
FIG. 15 is a cross section taken along line 15—15 of FIG. 11.

The various internal parts of the embodiment of FIG. 10 and the intercooperation thereof may be seen in the cross sections of FIGS. 11 and 12, which are cross sections taken on an expanded scale and illustrating the valve in the valve closed and in the valve opened and regulating positions, respectively. As may be seen in these figures, the upper body member 304 has a valve seat 310 integral therewith, with a downward projecting annular region 312 fitting within and being cemented or otherwise fastened to the upward extending portion 314 of the lower body member 306. The lower body member 306 is ported in the region below the protrusion 312 on the upper body member, as is perhaps best illustrated in FIG. 15. In particular, in the embodiment shown, there are three ported regions 316 which, together with the inlet port region 300 and annular region 318, provide fluid communication between the inlet and region 320 just below the valve seat 310. It will be noted also that the webs 322 (see particularly FIG. 15) support an inner member 324 providing a base and stabilizing support 326 for an internal spring 328 acting in compression against a valve actuating member 330 thereabove.

The upper part 332 of member 324 provides a support for an elastic diaphragm 334 which effectively seals the internal region of member 324 from the fluid within the pressure regulating valve. The outer periphery of diaphragm 334 has an enlarged region 336 which is retained in position on member 324 by a clamp ring 338 forced into and retained in the position shown by a plurality of leg-like upward protrusions 340 thereon retained in position by the annular extension 312 of upper body member 304. The inner periphery of the diaphragm likewise has an enlarged region 342 resting within a cooperatively disposed relief at the top of member 324 and clamped in that position by a combination of spool-like standoff member 344, valve closure member 346 and retaining screw 348. The valve closure member, of course, has a cooperatively disposed elastic seal member 350 to provide the desired seal against the valve seat 310 when the valve closure member 346 is in the valve closed position, either because of the valve being closed as shown in FIG. 11 or because of the valve regulating at the desired outlet pressure in a zero flow condition.

Figure 13:
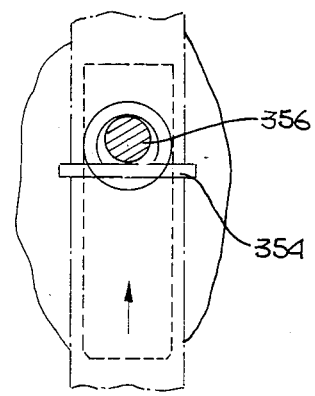
FIGS. 13 and 14 are partial cross sections illustrating the operation of the valve shut off cam.
Figure 14:
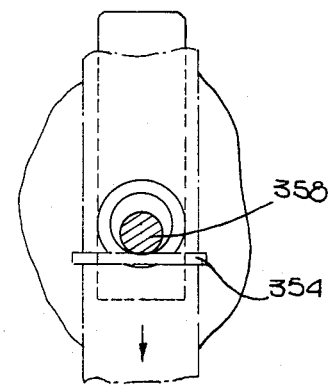

It will be noted from the figures that the valve actuating member 330 has a downward projecting extension 352 which has a lose slide fit in the lower part of member 324 to provide a vertical guide for the actuating member. The actuating member also has a step 354 which cooperates with a cam driven by the handle 308 to provide an on/off control for the valve. In particular, as may be seen in FIG. 15, one of the webs 322 is considerably wider than the other two separating the three ported areas 316 and has a horizontal hole therethrough into the interior region of the valve actuating assembly. The handle 308 in turn has an integral shaft 356 with a small protrusion 358 at the end thereof to snap over the inner edge of the opening to retain the handle and shaft in position. The shaft 356 has a fully eccentric hole in the inner end thereof to receive a short metal pin 360 to serve as a crank pin or cam to either provide vertical freedom for the valve actuating member when in the position shown in FIG. 12 or to hold the valve actuating member in the down or valve closed position as illustrated in FIG. 12. The operation of the cam pin 356 is also illustrated in FIGS. 13 and 14 which again illustrate a portion of the mechanism in the valve open and the valve closed positions respectively. Of course, when in the condition illustrated in FIG. 13 which effectively shows the valve closure assembly being in the valve open position, the valve closure assembly is in fact free to move up and down in response to the pressure in the outlet port 302 to regulate that pressure.

It will be noted from FIGS. 11 and 12 that the diaphragm 334 has a single full convolution and does not substantially change shape but rather effectively rolls along the inner diameter of projection 332 of the lower body 306 and the outer diameter of the valve actuating member 330. In the preferred embodiment however, the diaphragm is not molded in the shape shown, but rather is molded in a truncated, substantially conical (unconvoluted) shape, the top and bottom thereof coinciding in geometry with the top and bottom shown in the drawing. The finished diaphragm is then forced into the convoluted shape for assembly as shown, in which shape it will remain. The molding of the diaphragm in this form however, rather than in the convoluted form, ultimately results in a convoluted diaphragm which has no preferred position in the assembly, thereby avoiding any significant tendency of the diaphragm to itself encourage the regulator toward an open or closed position or some intermediate position therebetween.

As previously described, in general it is desired to pick the effective diameter of the diaphragm 334 to be substantially equal to the diameter of valve seat 310 so that the inlet pressure provides substantially zero net force on the moveable pressure regulating valve member, with the result that the outlet pressure in port 302 is determined by the balance between the outlet pressure times the area of the valve seat, and the force of the compression spring 328. It has been found however, that in some applications even better regulation can be obtained by a significant deviation from such pressure balancing. By way of example, consider a typical application for the present invention, namely a drinking fountain wherein line pressure may vary radically with momentary water flow demands of other devices on the same line, with time of day or from day to day. It is these variations that frequently give water fountains an output comprising a mere dribble at one moment and a squirt in the eye only a short time thereafter. However, regardless of the supply line pressure variation, the ideal fountain pressure and flow rate is essentially predetermined by fountain design independent of the specific installation thereof. Accordingly, one can plot a curve of valve position versus line pressure for the desired constant output pressure and flow rate of a given pressure regulating valve, as shown in FIG. 16. Also, since coil spring 328 necessarily has a finite preload, some of which is released as the valve moves toward the open position, one may plot spring force against valve position, generally a straight line function, as shown in FIG. 17. Combining these two curves, one can plot spring force versus line pressure for the same constant output pressure and flow rate, as shown in FIG. 18. In general this curve will deviate somewhat from a straight line, though may be reasonably approximated by a straight line over the range of line pressures of interest by the equation $F_s = F_o + KP_L$ where $F_s$ is the spring force, $F_o$ is the linearized spring force for zero line pressure, $P_L$ is the line pressure, and K is the slope of the spring force versus line pressure curve. Since the spring force, which is a valve opening force, increases with line pressure, better regulation is obtained if there is an offsetting line pressure dependent valve closing force. This, of course, is readily obtained by effectively "over pressure balancing" the regulator, more specifically by making the effective area of the diaphragm 334 slightly larger than the effective area of the valve seat 310. Thus instead of a spring force $F_s$ tending to open the valve against the outlet pressure, the spring force is reduced by a line pressure dependent factor, so that the net valve opening force acting against the outlet pressure tending to close the valve is given by the equation $F_s - \Delta A P_L$ where $\Delta A$ is the incremental area by which the effective area of diaphragm 334 exceeds the effective area of the valve seat 310. Putting this in the foregoing equation results in the following:

$$F_s - AP_L = F_O + KP_L - \Delta AP_L$$

Accordingly, for the desired constant output pressure and flow rate, the line pressure dependence of the net valve opening force and thus the line pressure dependence in the outlet pressure caused by the finite length of spring 328 (and to a lesser extent the fluid flow characteristics around valve seat 310 and valve closure members 346 and 350) may essentially be eliminated if the effective area of diaphragm 334 exceeds the effective area of valve seat 310 by an amount equal to K, the slope of the spring force versus line pressure curve over the expected range of the line pressure and for the desired constant output pressure and flow rate. Further, while the extent of the ideal pressure unbalancing will vary if the desired output pressure and/or flow rate are changed, approximations applicable to most uses of a given pressure regulating valve may be made. In particular, normally the desired regulated output pressure is substantially below normal line pressure, which tends to de-emphasize the effect of the output pressure, allowing that parameter to be changed for different applications without substantial effect on the desired pressure regulation in the presence of substantial line pressure variations. Further, the normal flow rates for a particular pressure regulating valve tend to be fairly well bounded throughout various applications, as particularly high flow rates suggest the use of a different (larger) valve, and particularly low flow rates suggest that the use of a smaller valve would be appropriate. Accordingly, a substantial pressure regulation enhancement can be achieved in accordance with the foregoing concepts of the present invention, and particularly compact coil spring assemblies may be used, through the utilization of the foregoing inlet pressure overbalancing or unbalancing on the inlet pressure side toward a valve closed condition.

Figures 19, 20:
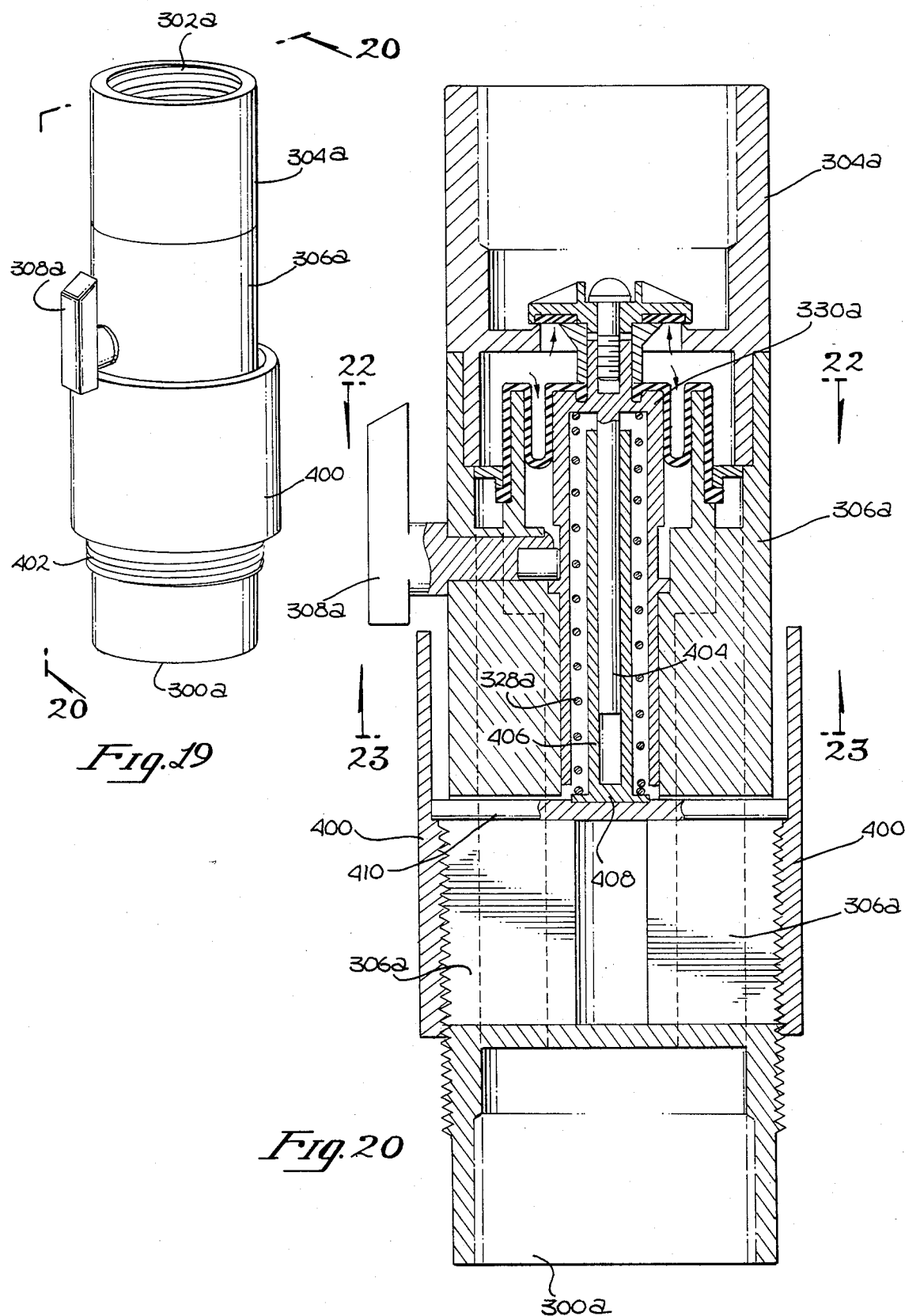

Now referring to FIG. 19, in perspective view of a still further alternate embodiment may be seen. This embodiment is very similar to the embodiment of FIG. 10, though includes a further feature of adjustability in the regulated pressure. Because of the general similarities in design and function of many of the parts making up the valve, parts in this embodiment (further illustrated in detail in FIGS. 22 and 23), having substantially the same design and function as the corresponding parts of the embodiment of FIG. 10 as illustrated in detail in FIGS. 11 through 14 are identified with the same numerals followed by the postscript (a), with the prior description of the general design and function thereof being also applicable to this further embodiment. Thus, as shown in FIG. 19, the pressure regulating valve is provided with coaxial inlet and outlet ports 300a and 302a and lower and upper body members 306a and 304a respectively, with a valve control handle 308a at the side of the lower body member 306a. In addition however, is an adjustment collar 400 threadedly engaging threads 402 on the lower body member 306a.

FIGS. 20 and 21 are cross sections of the embodiment of FIG. 19, similar to the cross sections of FIGS. 11 and 12 respectively. As may be seen by a comparison of these figures and the numbering thereof, most of the parts have the physical and functional equivalents found in the earlier embodiment. The primary difference is that a valve actuating member 330a has a central post 404 thereon having a loose sliding fit within tubular extension 406 of member 408, the coil spring 328a working between the valve actuating member 330a and member 408. Member 408 in turn rests on pin 410 passing through slots in the lower body member 306a so as to engage a lip on the adjustment collar 400 (shown in the figures as being near its upper limit or highest regulating pressure). In that regard, it will be noted from FIGS. 22 and 23 that the ported regions 316a are only two in number and symmetrical, with the vertical slots in lower body member 306a for the vertical translation of pin 410 being in the webs separating the ports 316a so that as before, the entire on/off mechanism and the bias spring mechanism as well as the adjustment mechanism therefor are isolated from the regions in fluid communication between the inlet and outlet ports. In fact, it may be seen with this as well as the earlier embodiments, that such isolation minimizes the nature and extent of the seals required to prevent fluid leakage, in the single diaphragm units effectively eliminating all sliding and rotating seals. It also eliminates the need for a particularly corrosion resistant spring for the bias spring or particularly corrosion resistant materials for the shut off and/or adjustment mechanisms, even when pressure regulating valves are being used with corrosive fluids. In that regard, the present invention pressure regulating valve is well suited to either metal or plastic fabrication, or any combination thereof as desired.

The pressure regulating valves of the present invention are easy to manufacture and assemble and will deliver a fluid at the desired regulated pressure with very good accuracy in spite of reasonable pressure variations in the supply system. Of course, while the invention has been disclosed and described with respect to certain preferred embodiments thereof, it will be understood to those skilled in the art that various changes in form and detail may be made therein without departing from the spirit and scope of the invention.

We claim:

1. A pressure regulating valve for receiving fluid from a fluid source and controllably delivering fluid at a regulated pressure comprising first and second housing members, each having first and second ends, said first housing member having an inlet port at said first end thereof, said second housing member having an outlet port at said first end thereof and a valve seat having a valve seat opening therethrough adjacent said second end and facing said first end thereof, said first and second housing members being joined adjacent said second ends thereof so that said inlet port, said outlet port and said valve seat are all coaxial, said first housing member having a spring housing integral therewith and supported internally to said first housing member on at least one support so as to allow fluid flow therebetween, said spring housing being closed adjacent the inlet port end thereof, a compression spring within said spring housing, a valve closure assembly fitting at least in part within said spring housing and extending through said valve seat opening, said valve closure assembly having a valve closure member facing said valve seat, said valve closure assembly being moveable along the axis of said valve seatbetween a closed position with said valve closure member engaging said valve seat and an open position with said valve closure member displaced from said valve seat and toward said second port, said compression spring urging said valve closure assembly to said open position, a diaphragm sealingly fastened adjacent its outer periphery to said spring housing and sealingly fastened adjacent its inner periphery to said valve closure assembly, thereby sealing said spring housing and isolating said spring from fluid in said inlet and outlet ports, and cam means extending radially through said first housing means, said at least one spring housing support and said spring housing, said cam means being a manually operable means for engaging said valve closure assembly and forcing said assembly to said closed position.

2. The pressure regulating valve of claim 1 wherein the effective area of said diaphragm is substantially equal to the area of said valve seat, whereby the pressure in said inlet port produces substantially zero net force on said valve closure assembly.

3. The pressure regulating valve of claim 1 wherein the effective area of said diaphragm is a predetermined amount larger than the area of said valve seat.

4. The pressure regulating valve of claim 3 wherein said diaphragm is an elastomeric diaphragm molded in an unconvoluted form and deflected into a convoluted form on assembly of said pressure regulating valve, whereby said diaphragm does not have a preferred position in the assembled valve.

5. The pressure regulating valve of claim 1 wherein the effective area of said diaphragm is larger than the area of said valve seat to cause a predetermined inlet pressure dependent force tending to move said valve closure assembly toward said closed position, said spring having a predetermined and finite spring rate to cause a spring force urging said valve closure assembly to the open position dependent on the position of said valve closure assembly, said diaphragm area being selected for a predetermined flow rate through said pressure regulating valve to cause said predetermined inlet pressure dependent force to approximately compensate for changes in the force of said spring caused by inlet pressure dependent changes in the valve assembly position for the predetermined flow rate, whereby for a predetermined flow rate through said pressure regulating valve, the regulating pressure in the said outlet port will be substantially inlet pressure independent.

6. The pressure regulating valve of claim 1 wherein said compression spring acts between said valve closure assembly and said spring housing.

7. The pressure regulating valve of claim 1 further comprised of a spring preloading member, and an adjustment member, manually adjustable in position, said spring preloading member extending through said first housing member, said at least one spring housing support and into said spring housing, said compression spring acting between said valve closure assembly and said preloading member, said preloading member being responsive to said adjustment member to vary the compression of said compression spring, thereby adjusting the regulating pressure of said pressure regulating valve.

8. The pressure regulating valve of claim 7 wherein said adjustment member is substantially concentric with and threadedly engages said first housing member so as to be rotatable with respect thereto to controllably move along the axis thereof.

9. The pressure regulating valve of claim 1 wherein said diaphragm is a convoluted diaphragm.

* * * * *

UNITED STATES PATENT AND TRADEMARK OFFICE
CERTIFICATE OF CORRECTION

PATENT NO. : 4,516,600
DATED : May 14, 1985
INVENTOR(S) : Sturman et al.

It is certified that error appears in the above-identified patent and that said Letters Patent is hereby corrected as shown below:

| COLUMN | LINE | DESCRIPTION |
|---|---|---|
| 4 | 23 | Please delete "ith" and insert --with--. |
| 7 | 34 | Please delete "unscrewin9" and insert --unscrewing--. |
| 7 | 35 | Please delete "ust" and insert --just--. |
| 11 | 15 | Please delete "$F_s - AP_L = F_0 + KP_L - \Delta AP_L$" and insert --$F_s - \Delta AP_L = F_0 + KP_L - \Delta AP_L$-- |

Signed and Sealed this

Twenty-second Day of April 1986

[SEAL]

Attest:

DONALD J. QUIGG

Attesting Officer

Commissioner of Patents and Trademarks